United States Patent
Inowaki

(10) Patent No.: US 10,252,383 B2
(45) Date of Patent: Apr. 9, 2019

(54) BOLTING TOOL AND BOLT MOUNTING JIG

(71) Applicant: FANUC CORPORATION, Yamanashi (JP)

(72) Inventor: Masafumi Inowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 15/432,258

(22) Filed: Feb. 14, 2017

(65) Prior Publication Data

US 2017/0266771 A1 Sep. 21, 2017

(30) Foreign Application Priority Data

Mar. 15, 2016 (JP) .................................. 2016-050577

(51) Int. Cl.
*B23P 19/06* (2006.01)
(52) U.S. Cl.
CPC ..................................... *B23P 19/06* (2013.01)
(58) Field of Classification Search
CPC ............................. B23P 19/06; B25B 23/101
USPC ......................................................... 81/57.36
See application file for complete search history.

(56) References Cited

U.S. PATENT DOCUMENTS

| | | | | |
|---|---|---|---|---|
| 3,396,765 A | * | 8/1968 | Ridenour | B25B 13/06 411/404 |
| 3,452,373 A | * | 7/1969 | Vosbikian | B25B 13/06 7/138 |
| 5,520,075 A | * | 5/1996 | Barmore | B25B 13/06 81/437 |
| 2001/0006014 A1 | * | 7/2001 | Cowart | B25B 13/102 81/437 |
| 2011/0056340 A1 | | 3/2011 | Hsu | |

FOREIGN PATENT DOCUMENTS

| | | |
|---|---|---|
| JP | S44-011839 Y | 5/1969 |
| JP | S59-50680 U | 4/1984 |
| JP | S60-022260 U1 | 2/1985 |
| JP | H07-171771 A | 7/1995 |
| JP | 2013-000824 A | 1/2013 |

(Continued)

OTHER PUBLICATIONS

Search Report dated Mar. 9, 2018 in corresponding Japanese Application No. 2016-050577; 14 pages.

(Continued)

*Primary Examiner* — Hadi Shakeri
(74) *Attorney, Agent, or Firm* — Maier & Maier, PLLC

(57) ABSTRACT

Provided is a bolting tool that includes a mounting portion and a torque transfer portion. A bolt assembly is mounted to the mounting portion. The bolt assembly includes a bolt and a nut threaded onto a position along an external threaded portion of the bolt. The torque transfer portion transfers tightening torque to the bolt and the nut of the bolt assembly mounted to the mounting portion. The mounting portion includes a bolt engagement portion, which is engageable with a head of the bolt, a nut engagement portion, which is engageable with the nut, and a coupling portion, which couples the nut engagement portion to the bolt engagement portion coaxially and with a predetermined spacing therebetween.

1 Claim, 7 Drawing Sheets

(56) References Cited

FOREIGN PATENT DOCUMENTS

| | | |
|---|---|---|
| JP | 2014-030870 A | 2/2014 |
| JP | 2017-002575 A | 1/2017 |

OTHER PUBLICATIONS

Japanese Office Action dated Mar. 20, 2018, in connection with corresponding JP Application No. 2016-050577 (7 pgs., including English translation).

Japanese Office Action dated Jan. 8, 2019, in connection with corresponding JP Application No. 2016-050577 (6 pgs., including machine-generated English translation).

* cited by examiner

BOLTING TOOL AND BOLT MOUNTING JIG

CROSS-REFERENCE TO RELATED APPLICATIONS

This application claims the benefit of Japanese Patent Application No. 2016-050577, the content of which is incorporated herein by reference.

TECHNICAL FIELD

The present invention relates to a bolting tool and a bolt mounting jig.

BACKGROUND ART

Tools for fastening a lock nut to a long bolt, which has a long grip length, are conventionally known (see PTL 1, for example).

Tools of this type are tools used to lock a long bolt with a lock nut in such a manner that the long bolt, which includes the lock nut at a position along the thread, is fastened at its distal end to a threaded hole of a member to be bolted and then the lock nut only is tightened and pressed against the surface of the member to be bolted.

CITATION LIST

Patent Literature

{PTL 1}
Japanese Unexamined Patent Application, Publication No. 2013-824

SUMMARY OF INVENTION

One aspect of the present invention is a bolting tool that includes: a mounting portion to which a bolt assembly is to be mounted, the bolt assembly including a bolt and a nut threaded onto a position along an external threaded portion of the bolt; and a torque transfer portion that transfers tightening torque to the bolt and the nut of the bolt assembly mounted to the mounting portion. The mounting portion includes a bolt engagement portion engageable with a head of the bolt; a nut engagement portion engageable with the nut; and a coupling portion that couples the nut engagement portion to the bolt engagement portion coaxially and with a predetermined spacing therebetween.

DESCRIPTION OF EMBODIMENTS

A bolting tool 1 and a bolt mounting jig 22 according to an embodiment of the present invention will be described below with reference to the accompanying drawings.

Figure 1:
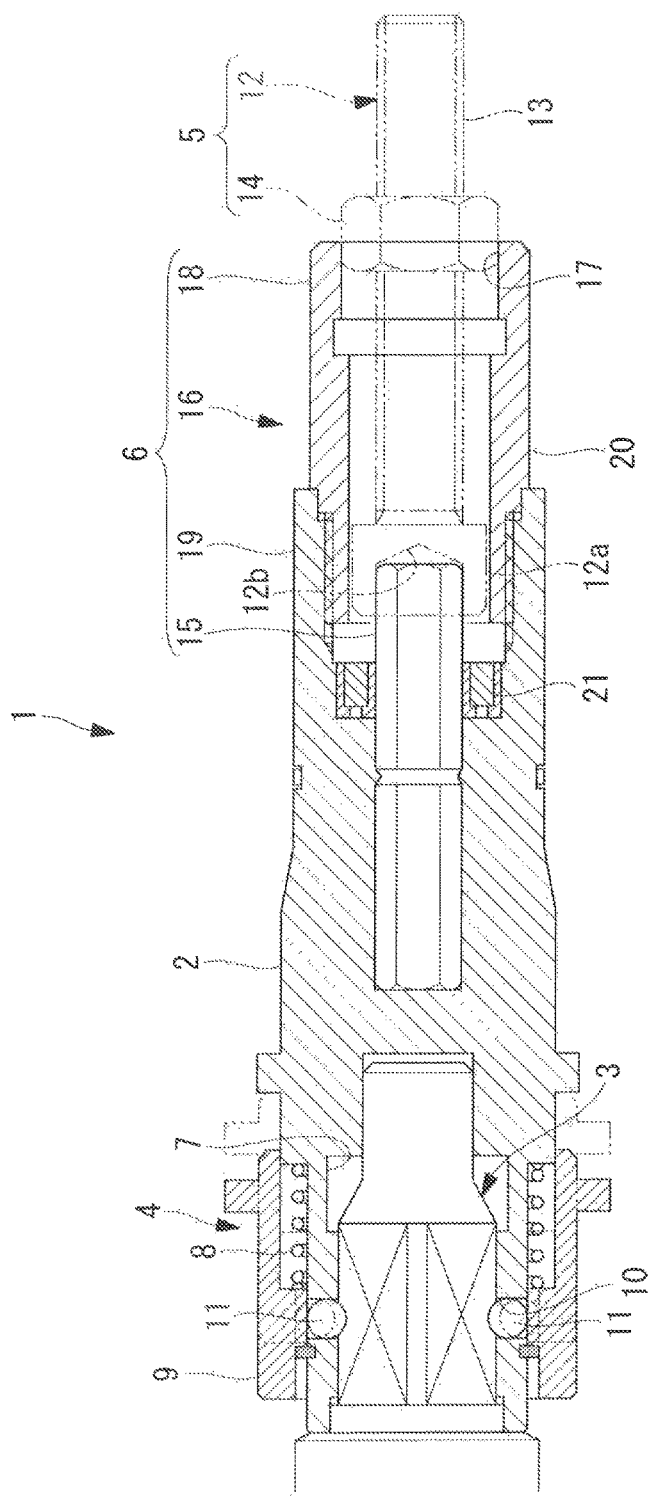
FIG. 1 is a longitudinal sectional view of a bolting tool according to an embodiment of the present invention.

As illustrated in FIG. 1, the bolting tool 1 according to the present embodiment includes a connection portion (torque transfer portion) 4 and a mounting portion 6. The connection portion (torque transfer portion) 4 is disposed at an end of a tool body 2, which has a substantially cylindrical shape, and is connected to an apparatus that generates tightening torque, e.g., a nut runner 3. The mounting portion 6 is disposed at the other end of the tool body 2 to receive a bolt assembly 5, which will be described later.

The connection portion 4 is a coupler that includes a receptacle portion 7, a collar 9, and a plurality of balls 11. The receptacle portion 7 has a cylindrical shape and receives the distal end of the nut runner 3; the collar 9 is disposed radially outward of the receptacle portion 7 so as to be movable in the axial direction and is biased toward the distal end by a spring 8; and the plurality of balls 11 are received in through holes 10, which pass through the wall of the receptacle portion 7 in the radial direction, and are forced inward in the radial direction by a shift of the collar 9 toward the distal end. The connection portion 4 is configured to be connected to the distal end of the nut runner 3 to transfer the tightening torque generated by the nut runner 3 to the mounting portion 6 via the tool body 2.

Figure 2:
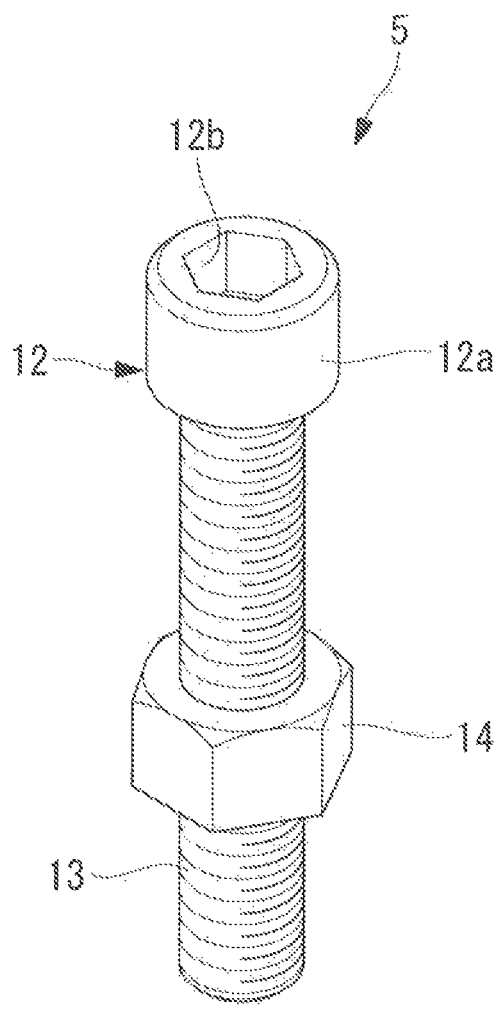
FIG. 2 is a perspective view of a bolt assembly that is to be fastened using the bolting tool of FIG. 1.

As illustrated in FIG. 2, the bolt assembly 5 is made up of a bolt constituted by a hexagonal socket head bolt 12, which has a sufficiently long grip length, and a hexagonal nut (nut) 14, which has been threaded onto a position along an external threaded portion 13 of the bolt 12. The hexagonal nut 14 is disposed at a predetermined grip length-determining position of the hexagonal socket head bolt 12.

The mounting portion 6 includes a hexagonal bit (bolt engagement portion) 15, a cylindrical portion (coupling portion) 16, and a hexagonal socket (nut engagement portion) 18. The hexagonal bit (bolt engagement portion) 15 is secured at the radial center of the tool body 2 at its other end and extends along the longitudinal axis; the cylindrical portion (coupling portion) 16 is disposed radially outward of the hexagonal bit 15 around its circumference with a spacing therebetween; and the hexagonal socket (nut engagement portion) 18 has a hexagonal hole 17, which defines the inner surface of the distal end of the cylindrical portion 16 and is engageable with the hexagonal nut 14.

The hexagonal socket 18 and the hexagonal bit 15 are disposed coaxially with their central axes aligned. They are located at positions with a predetermined axial spacing therebetween and are coupled to each other via the cylindrical portion 16.

The cylindrical portion 16 includes a first cylinder 19, which is integral with the tool body 2, and a second cylinder 20, which is connected to the hexagonal socket 18. The second cylinder 20 is abutted against and threadingly coupled to the first cylinder 19. The second cylinder 20, which is coupled with the first cylinder 19, can be replaced with other cylinders having different longitudinal lengths so that the grip length can thereby be adjusted.

Figure 7:
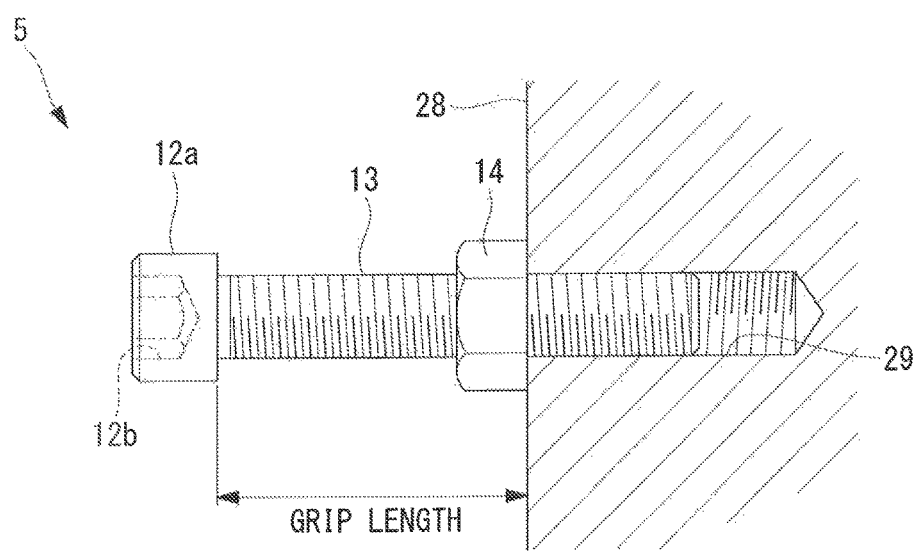
FIG. 7 illustrates a state in which the bolt assembly of FIG. 2 has been fastened to a member to be bolted.

The position at which the hexagonal nut 14 is to be placed in the bolt assembly 5 is determined depending on the grip length-determining position of the hexagonal socket head bolt 12 in a state in which it is locked with the hexagonal nut 14 after the bolt assembly 5 has been placed onto the member to be bolted 28 (see FIG. 7). Then, the axial position of the hexagonal socket 18 with respect to the hexagonal socket 15 is adjusted in the following manner.

Specifically, the adjustment of the axial position of the hexagonal socket 18 with respect to the hexagonal bit 15 is made so as to ensure that, as the bolt assembly 5, onto which the hexagonal nut 14 has been placed at a predetermined position, is inserted and brought inward in the cylindrical portion 16, the hexagonal bit 15 comes into partial engagement with a hexagonal hole 12b of the hexagonal socket head bolt 12 by a predetermined length before the hexagonal nut 14 is inserted into the hexagonal socket 18.

An annular permanent magnet 21 is disposed at the root portion of the hexagonal bit 15. The annular permanent magnet 21 can magnetically attract the head 12a of the hexagonal socket head bolt 12 of the bolt assembly 5, which is to be accommodated within the cylindrical portion 16.

Figure 3:
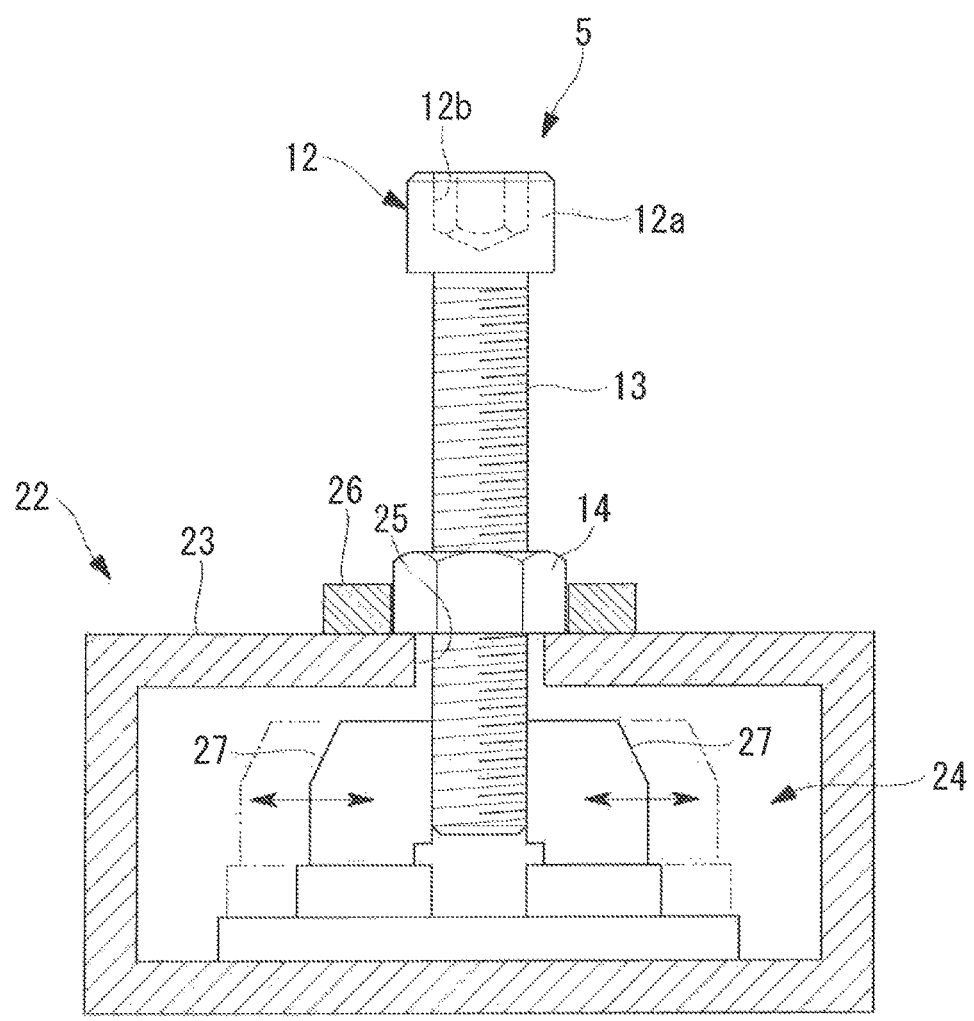
FIG. 3 is a longitudinal sectional view of a bolt mounting jig according to an embodiment of the present invention with the bolt assembly placed onto the jig.

Next, as illustrated in FIG. 3, the bolt mounting jig 22 according to the present embodiment includes a stage 23, on which the bolt assembly 5 is to be placed, and a bolt holding mechanism 24, which is located below the stage 23.

The stage 23 includes a through hole 25 and a nut two face restraint member (nut restraint member) 26. The through hole 25 allows the distal end of the hexagonal socket head bolt 12 to pass therethrough when the bolt assembly 5 is in a state in which the head 12a of the hexagonal socket head bolt 12 is positioned at an upper end and the hexagonal nut 14 is placed on the upper surface of the stage 23. The nut two face restraint member (nut restraint member) 26 is disposed at a position where it can hold the hexagonal nut 14 at at least two opposing faces.

The bolt holding mechanism 24 includes two claws (bolt restraint member) 27 that are opened and closed in the horizontal direction by an air cylinder, for example, and are capable of switching between the state in which the hexagonal socket head bolt 12 is restricted from rotation and the state in which the hexagonal socket head bolt 12 is permitted to rotate. The restriction is provided by holding the distal end of the hexagonal socket head bolt 12, which protrudes downwardly below the stage 23, between the two claws 27 as illustrated by the solid line in FIG. 3, and the permission is provided by withdrawing the two claws 27 from the distal end of the hexagonal socket head bolt 12 as illustrated by the chain line in FIG. 3.

Functions of the bolting tool 1 and the bolt mounting jig 22 according to the present embodiment, configured as described above, will be described below.

When the bolt assembly 5 is to be mounted to the bolting tool 1 by means of the bolt mounting jig 22 according to the present embodiment, the hexagonal nut 14 is to be threaded and placed onto a predetermined grip length-determining position along the external threaded portion 13 of the hexagonal socket head bolt 12 with high accuracy using the bolt mounting jig 22. Thus, the bolt assembly 5, onto which the hexagonal nut 14 has been placed at a predetermined position along the external threaded portion 13, is mounted to the bolt mounting jig 22.

Specifically, as illustrated in FIG. 3, the hexagonal socket head bolt 12 is placed vertically so that the head 12a of the hexagonal socket head bolt 12 of the bolt assembly 5 is located at an upper end, and the distal end is inserted into the through hole 25 of the stage 23 of the bolt mounting jig 22.

Thus, the hexagonal nut 14 is brought into contact with the upper surface of the stage 23 and the bolt assembly 5 is placed on the stage 23 in vertical position.

At this time, the two opposing faces of the hexagonal nut 14 are gripped by the nut two face restraint member 26, and thereby the rotation of the hexagonal nut 14 is restrained. In this state, the bolt holding mechanism 24 is actuated to bring the two claws 27 toward each other as indicated by the solid line in FIG. 3 to thereby grip the distal end of the hexagonal socket head bolt 12 between the claws 27. Accordingly, rotation of the hexagonal socket head bolt 12 about the longitudinal axis is also restrained.

Next, the bolting tool 1 according to the present embodiment, which has been attached to the distal end of the nut runner 3 via the connection portion 4, is set in a position such that the hexagonal socket 18 of the cylindrical portion 16 is located at a vertically lower position, and the bolting tool 1 is brought toward the bolt assembly 5, which has been placed onto the bolt mounting jig 22, from vertically above the bolt assembly 5.

Figure 4:
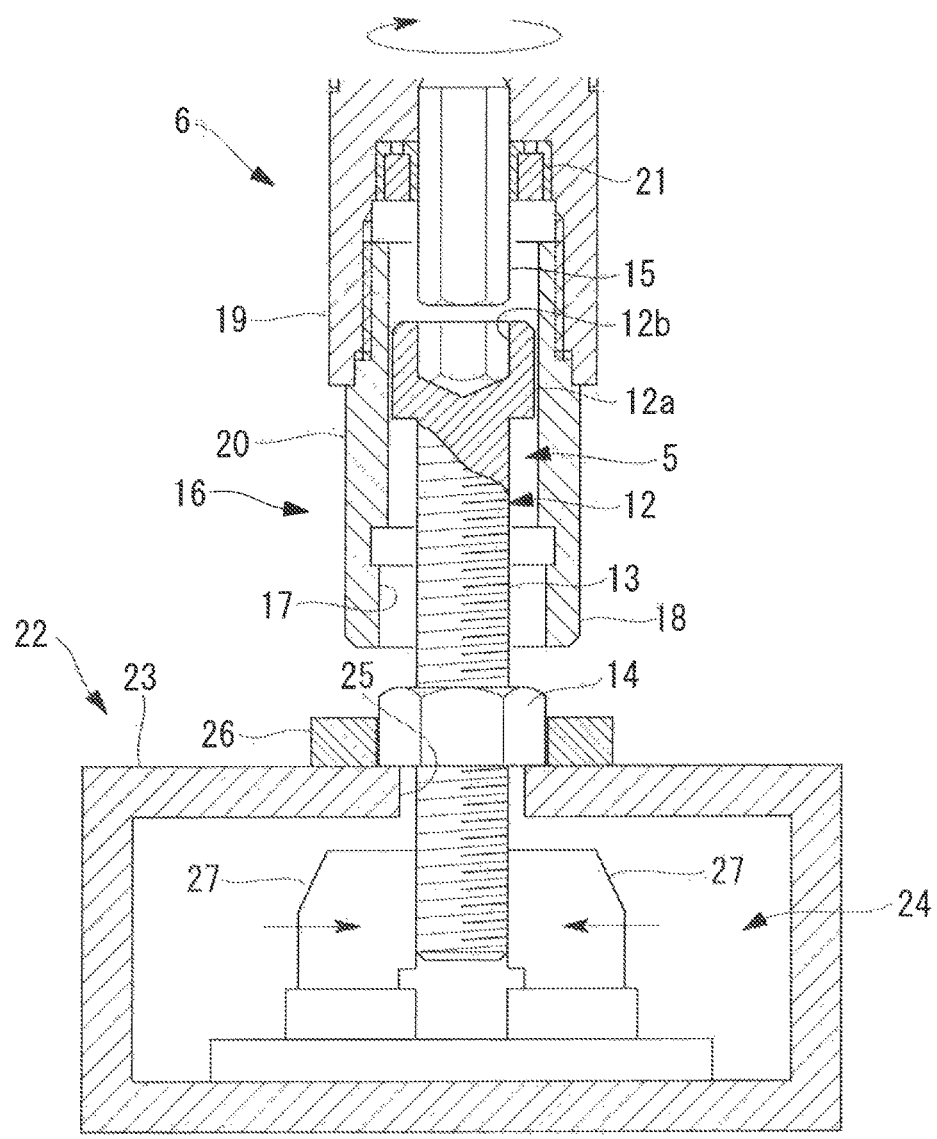
FIG. 4 is a longitudinal sectional view illustrating a process of mounting the bolt assembly, which has been placed onto the bolt mounting jig of FIG. 3, to the bolting tool of FIG. 1.

Accordingly, the hexagonal socket head bolt 12 of the bolt assembly 5 is inserted inward into the cylindrical portion 16 with the head 12a, at the upper side, being in the leading position, and as illustrated in FIG. 4, the hexagonal bit 15 comes into contact with the hexagonal hole 12b of the head 12a. If the phase of the hexagonal bit 15 and the phase of the hexagonal hole 12b are not matched with each other, the bolting tool 1 is to be slightly turned about the central axis.

Figure 5:
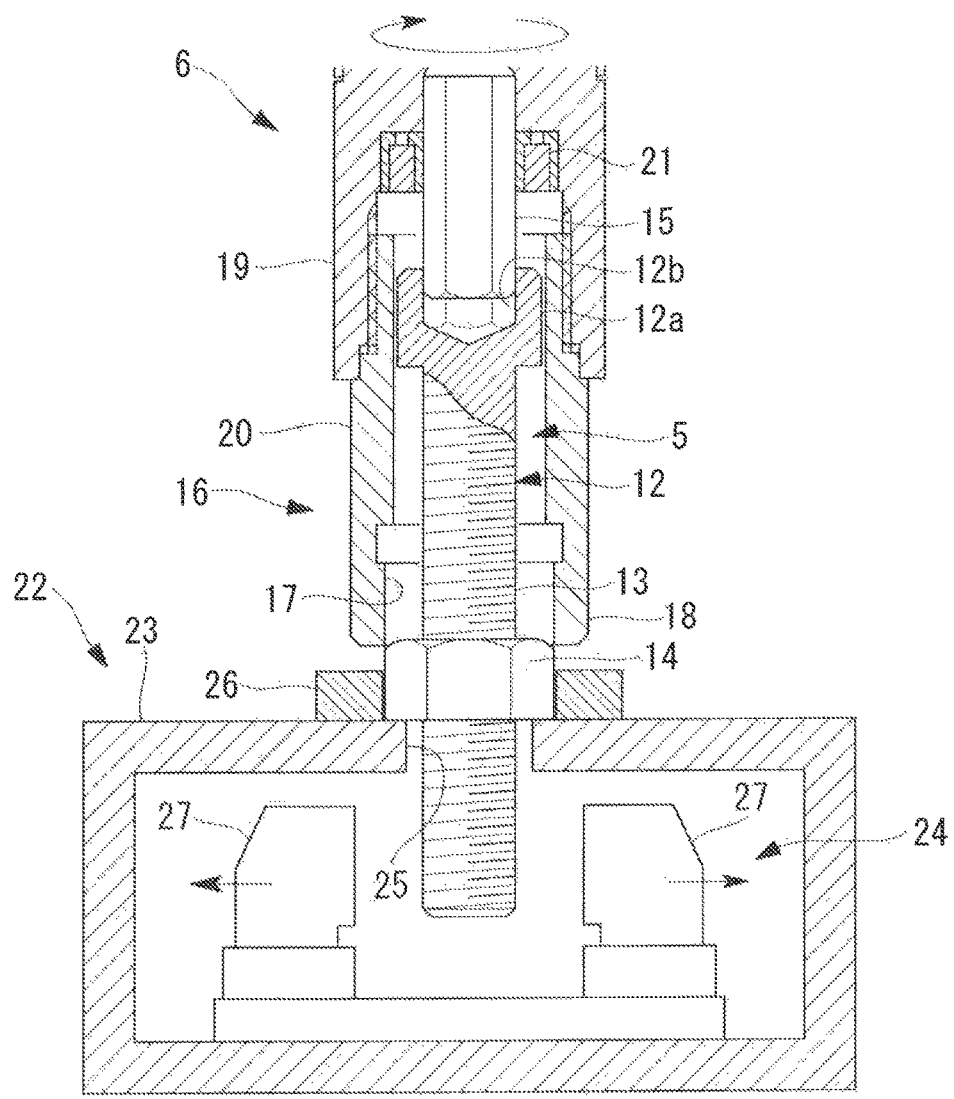
FIG. 5 is a longitudinal sectional view illustrating a state in which the bolting tool has been lowered from the state of FIG. 4 and the hexagonal bit and the hexagonal hole are partially engaged with each other.

The hexagonal socket head bolt 12 is restrained from rotation about the longitudinal axis by the bolt holding mechanism 24 and thus the hexagonal bit 15 can be rotated relative to the hexagonal socket head bolt 12 so as to match the phase of the hexagonal bit 15 with the phase of the hexagonal hole 12b. Once the phase of the hexagonal bit 15 and the phase of the hexagonal hole 12b are matched by slightly turning the hexagonal bit 15 using the nut runner 3, the bolting tool 1 becomes movable vertically downward along the longitudinal axis of the hexagonal socket head bolt 12, so that the hexagonal bit 15 is inserted into the hexagonal hole 12b partway as illustrated in FIG. 5.

At this time, the hexagonal socket 18 has not yet been engaged with the hexagonal nut 14. At this time, the claws 27, which hold the distal end of the hexagonal socket head bolt 12 in the bolt holding mechanism 24, are withdrawn in the horizontal direction to release the distal end of the hexagonal socket head bolt 12 from restraint as illustrated by the chain line in FIG. 3. Accordingly, the hexagonal socket head bolt 12 becomes rotatable about the longitudinal axis via rotation of the hexagonal bit 15, which is engaged with the hexagonal hole 12b, and therefore, by slightly turning the hexagonal socket head bolt 12, which is engaged with the hexagonal bit 15, about the longitudinal axis using the nut runner 3, the hexagonal socket 18 and the hexagonal nut 14 can be rotated relative to each other so that their phases can be matched with each other. The rotation for phase matching can be accomplished at a very small angle and therefore the position of the hexagonal nut 14 with respect to the hexagonal socket head bolt 12 does not vary greatly.

Figure 6:
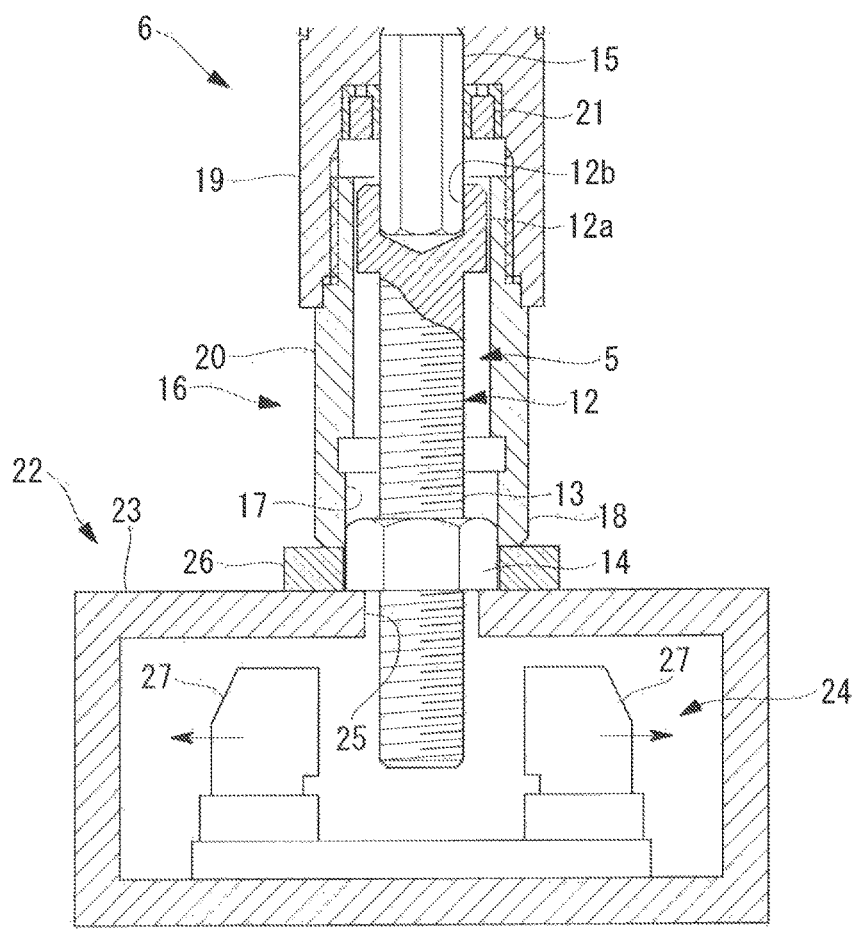
FIG. 6 is a longitudinal sectional view illustrating a state in which the bolting tool has been further lowered from the state of FIG. 5 and the hexagonal socket and the hexagonal nut as well are engaged with each other.

Then, when the phase of the hexagonal socket 18 and the phase of the hexagonal nut 14 have been matched with each other, the bolting tool 1 becomes movable vertically downward along the longitudinal axis of the hexagonal socket head bolt 12, and as illustrated in FIG. 6, the hexagonal bit 15 is inserted to a sufficient depth in the hexagonal hole 12b and the hexagonal socket 18 and the hexagonal nut 14 are brought into engagement with each other.

In this state, the hexagonal socket head bolt 12 is attracted, by magnetic attractive force of the permanent magnet 21, into the cylindrical portion 16 of the bolting tool 1 and are held and accommodated therein.

In this manner, by means of the bolt mounting jig 22, the bolt assembly 5, onto which the hexagonal nut 14 has been threaded at a predetermined position along the external threaded portion 13 of the hexagonal socket head bolt 12, is mounted to the bolting tool 1. Thus, the bolting tool 1, to which the bolt assembly 5 has been mounted, is transferred to a fastening position of the member to be bolted 28 by moving the nut runner 3, and after placing the distal end of the hexagonal socket head bolt 12 coaxially onto an internal threaded portion 29, which is formed in the member to be bolted 28, the nut runner 3 is actuated.

Thus, the hexagonal socket head bolt 12, which is engaged with the hexagonal bit 15, and the hexagonal nut 14, which is engaged with the hexagonal socket 18, are rotated simultaneously about the longitudinal axis of the hexagonal socket head bolt 12, and accordingly the external threaded portion 13 of the hexagonal socket head bolt 12 is tightened onto the internal threaded portion 29 of the member to be bolted 28. Then, at a position where the hexagonal nut 14 is abutted against the surface of the member to be bolted 28, as illustrated in FIG. 7, the hexagonal socket head bolt 12, locked by the hexagonal nut 14, is fastened to the member to be bolted 28.

In the process of this tightening operation, the hexagonal socket head bolt 12 and the hexagonal nut 14 are rotated at the same time and at the same rate by the bolting tool 1 and therefore their relative positions do not change, and as a result, there is an advantage in that the fastening is achieved while maintaining the grip length of the hexagonal socket head bolt 12, which is to be screwed into the member to be bolted 28, with high accuracy.

As described above, the bolt mounting jig 22 according to the present embodiment enables easy mounting of the bolt assembly 5, in which the grip length of the hexagonal socket head bolt 12 has been set with high accuracy, to the bolting tool 1. Furthermore, the bolting tool 1 according to the present embodiment provides the advantage of achieving fastening of the bolt assembly 5, which has been mounted to the bolting tool 1 as described above, to the member to be bolted 28 while maintaining the set grip length. In addition, the bolt mounting jig 22 and bolting tool 1 according to the present embodiment provide the further advantage of achieving easy automation of the operation of fastening to the member to be bolted 28 by setting the grip length with high accuracy.

In this embodiment, the torque transfer portion for transferring tightening torque is exemplified by the connection portion 4, such as a coupler, that is connected to the nut runner 3, which generates tightening torque, but this is not limiting and the torque transfer portion may be a transfer portion that is engaged at its two faces with a spanner. Even when manual tightening operation using a spanner that is engaged at two faces is employed, fastening of the bolt assembly 5 to the member to be bolted 28 can be accomplished while maintaining the grip length set with high accuracy.

From the above-described embodiment, the following invention is derived.

One aspect of the present invention is a bolting tool that includes: a mounting portion to which a bolt assembly is to be mounted, the bolt assembly including a bolt and a nut threaded onto a position along an external threaded portion of the bolt; and a torque transfer portion that transfers tightening torque to the bolt and the nut of the bolt assembly mounted to the mounting portion. The mounting portion includes a bolt engagement portion engageable with a head of the bolt; a nut engagement portion engageable with the nut; and a coupling portion that couples the nut engagement portion to the bolt engagement portion coaxially and with a predetermined spacing therebetween.

According to this aspect, when the bolt assembly, which has the nut threaded onto a predetermined position along the external threaded portion of the bolt, has been mounted to the mounting portion, the head of the bolt comes into engagement with the bolt engagement portion and the nut comes into engagement with the nut engagement portion. The bolt engagement portion and the nut engagement portion are coupled to each other by the coupling portion coaxially and with a predetermined spacing therebetween, and therefore the bolt and the nut are restricted from relative rotation about the longitudinal axis of the bolt.

In this state, the distal end of the bolt is set onto a threaded hole of a member to be bolted and tightening torque is transferred to the bolt and nut by the torque transfer portion, so that the bolt assembly can thereby be rotated integrally about the longitudinal axis of the bolt to be tightened onto the threaded hole. As a result, fastening of the nut to the bolt is accomplished so as to ensure a constant grip length of the bolt.

In the above aspect, the bolt may be a hexagonal socket head bolt, the bolt engagement portion may be a hexagonal bit that is brought into engagement with a hexagonal hole of the bolt by a shift of the bolt along a longitudinal axis of the bolt, the nut may be a hexagonal nut, and the nut engagement portion may be a hexagonal socket that is brought into engagement with an outer surface of the nut by the shift of the bolt along the longitudinal axis of the bolt.

With this configuration, by bringing the bolt assembly and the mounting portion relatively toward each other along the longitudinal axis, the bolt engagement portion, which is constituted by a hexagonal bit, can be brought into engagement with the hexagonal hole in the head of the bolt, and the nut engagement portion, which is constituted by a hexagonal socket, can be brought into engagement with the outer surface of the nut, which is constituted by a hexagonal nut. By virtue of this configuration, the bolt assembly, which includes a nut threaded onto a predetermined position along the external threaded portion of the bolt, can be mounted to the mounting portion simply by moving the bolt assembly and the mounting portion relative to each other along the longitudinal axis, and therefore the mounting can be accomplished readily.

Furthermore, in the above aspect, the nut engagement portion and the bolt engagement portion may be located at such positions that, when the mounting portion and the bolt assembly are moved relative to each other along the longitudinal axis of the bolt to mount the bolt assembly to the mounting portion, the bolt engagement portion comes into engagement with the bolt before the nut engagement portion comes into engagement with the nut.

With this configuration, when the bolt assembly and the mounting portion are brought relatively toward each other along the longitudinal axis, the bolt engagement portion, which is constituted by a hexagonal bit, firstly comes into engagement with the hexagonal hole in the head of the bolt, and then, the nut engagement portion, which is constituted by a hexagonal socket, comes into engagement with the outer surface of the nut, which is constituted by a hexagonal nut. The bolt engagement portion comes into engagement with the bolt in a state in which the nut engagement portion has not yet come into engagement with the nut, and therefore, even if the phase of the bolt and the phase of the nut are not aligned with each other, by performing phase matching by slightly turning the bolt with respect to the nut, the bolt and the nut can be together brought into engagement with the bolt engagement portion and the nut engagement portion, respectively.

Another aspect of the present invention is a bolt mounting jig configured to mount the bolt assembly to the bolting tool, and the bolt mounting jig includes: a nut restraint member configured to restrain rotation of the nut about the longitudinal axis of the bolt; and a bolt restraint member capable of switching between restraining and permitting rotation of the bolt about the longitudinal axis of the bolt at a distal end of the bolt.

According to this aspect, when a bolt assembly is to be mounted to the mounting portion of the bolting tool, the nut is restrained from rotation about the longitudinal axis of the bolt by the nut restraint member and the bolt is restrained from rotation about its longitudinal axis by the bolt restraint member, and then, as the mounting portion is brought toward the bolt assembly in a direction along the longitudinal axis of the bolt, firstly the bolt engagement portion, which is constituted by a hexagonal bit, comes into contact with the hexagonal hole in the head of the hexagonal socket head bolt.

Since the rotation of the bolt is restrained by the bolt restraint member, the phase of the hexagonal bit and the phase of the hexagonal hole can be readily matched with each other by slightly turning the bolting tool about the central axis of the hexagonal bit. By bringing the mounting portion further toward the bolt assembly in this state, the hexagonal bit can be brought into engagement with the hexagonal hole.

At this time, the nut engagement portion, which is constituted by a hexagonal socket, has not yet been engaged with the outer surface of the hexagonal nut, and therefore, by removing the restraint of rotation of the bolt provided by the bolt restraint member, rotation of the bolt about the longitudinal axis is permitted. Then, by slightly turning the bolting tool about the central axis of the hexagonal bit, the phase of the hexagonal socket and the phase of the hexagonal nut can be readily matched with each other. By bringing the mounting portion further toward the bolt assembly in this state, the hexagonal socket can be brought into engagement with the outer surface of the hexagonal nut, and by bringing the mounting portion further toward the bolt assembly, mounting of the bolt assembly to the mounting portion of the bolting tool can be accomplished.

REFERENCE SIGNS LIST 1 bolting tool
4 connection portion (torque transfer portion)
5 bolt assembly
6 mounting portion
12 hexagonal socket head bolt (bolt)
12a head
13 external threaded portion
14 hexagonal nut (nut)
15 hexagonal bit (bolt engagement portion)
16 cylindrical portion (coupling portion)
17 hexagonal hole
18 hexagonal socket (nut engagement portion)
22 bolt mounting jig
26 nut two face restraint member (nut restraint member)
27 claw (bolt restraint member)

The invention claimed is:

1. A mounting system including a bolting tool and a bolt mounting jig configured to mount a bolt assembly to the bolting tool, the bolt assembly including a bolt and a nut threaded onto a position along an external threaded portion of the bolt, the bolting tool comprising:
a mounting portion configured so that the bolt assembly is mounted thereto; and
a torque transfer portion that transfers tightening torque to the bolt and the nut of the bolt assembly when the bolt assembly is mounted to the mounting portion,
the mounting portion comprises:
a bolt engagement portion engageable with a head of the bolt;
a nut engagement portion engageable with the nut; and
a coupling portion that couples the nut engagement portion to the bolt engagement portion coaxially and with a predetermined spacing therebetween,
the bolt comprises a hexagonal socket head bolt,
the bolt engagement portion comprises a hexagonal bit that is brought into engagement with a hexagonal hole of the bolt by a shift of the bolt along a longitudinal axis of the bolt,
the nut comprises a hexagonal nut,
the nut engagement portion comprises a hexagonal socket that is brought into engagement with an out surface of the nut by the shift of the bolt along with the longitudinal axis of the bolt,
the nut engagement portion and the bolt engagement portion are located at such positions that, when the mounting portion and the bolt assembly are moved relative to each other along the longitudinal axis of the bolt to mount the bolt assembly to the mounting portion, the bolt engagement portion comes into engagement with the bolt before the nut engagement portion comes into engagement with the nut, and
the bolt mounting jig comprises:
a nut restraint member configured to restrain rotation of the nut about the longitudinal axis of the bolt; and
a bolt restraint member capable of switching between restraining and permitting rotation of the bolt about the longitudinal axis of the bolt at a distal end of the bolt.

* * * * *